United States Patent
Shields et al.

[15] 3,668,472
[45] June 6, 1972

[54] GROUND DETECTION CIRCUIT FOR A D.C. DISTRIBUTION NETWORK

[72] Inventors: William B. Shields, Reading; Victor H. Willems, Shillington; William F. Sailer, Sinking Spring, all of Pa.

[73] Assignee: Gilbert Associates, Inc., Reading, Pa.

[22] Filed: May 17, 1971

[21] Appl. No.: 144,066

[52] U.S. Cl. ........................317/18 R, 317/27 R, 317/33 SC, 317/49
[51] Int. Cl. ..............................................H02h 3/28
[58] Field of Search ......................317/49, 18 R, 18 D, 33 SC, 317/27 R; 340/255

[56] References Cited

UNITED STATES PATENTS 3,066,284 11/1962 McKinley et al. ..................340/255
3,573,552 4/1971 Forfod .................................317/18 R

*Primary Examiner*—James D. Trammell
*Attorney*—William J. Ruano

[57] ABSTRACT

The invention relates to a ground detection circuit for an ungrounded D.C. distribution network. The sensitivity to ground is uniquely independent of polarity of the D.C. bus on which the ground occurs. The occurrence of multiple grounds will cause the ground detection circuit to operate as if all such ground resistances were in parallel with each other. The principle of detection is based on the fact that the algebraic sum of currents flowing through a resistance, having one end connected to ground and the other end being alternately connected to the plus and then to the minus bus of the center tap battery source, is inversely proportional to the "total resistance" to ground of the network, where "total resistance" is the equivalent of placing all resistances to ground in parallel.

8 Claims, 4 Drawing Figures

INVENTORS
WILLIAM B. SHIELDS
VICTOR H. WILLEMS
WILLIAM F. SAILER
BY
*William J. Ruano*
their ATTORNEY

GROUND DETECTION CIRCUIT FOR A D.C. DISTRIBUTION NETWORK

This invention relates to a ground detection circuit and, more particularly, to a solid state ground detection circuit for a D.C. distribution network.

In the past, great difficulty has been experienced in accurately monitoring the resistance to ground of a network. One of the reasons is that conventional ground detection circuits are: (1) sensitive to and dependent upon the polarity of the D.C. bus on which the ground occurs and (2) they are adversely affected by multiple grounds occurring on different buses.

Another disadvantage was that such network and ground detectors are subject to misoperation due to voltage transients and high values of distributed capacitance to ground.

An object of the present invention is to provide a novel ground detection circuit for D.C. distribution networks which overcomes the above-named disadvantages by being independent of: (1) the polarity ( plus, plus/minus or minus) of a D.C. bus on which the ground occurs, (2) The number of busses which are grounded simultaneously.

A further object of the invention is to provide a solid state ground detection circuit for D.C. distribution networks which is not only independent of polarity but which can accommodate high values of distributed capacitance to ground and which includes integration circuitry to prevent misoperation due to voltage transients.

Other objects and advantages will become more apparent from a study of the following description, taken with the accompanying drawing wherein.

The principle of detection of the present invention is based on the fact that the algebraic sum of the current flowing through a resistance having one end connected to ground and the other end being alternately connected to the plus and then to the minus bus of a battery source of power, is inversely proportional to the "total resistance" to ground of the network, such grounds occurring on any or all of any number of buses connected to battery taps.

This algebraic sum of the current, as demonstrated hereinafter is equal to $(I1 + I2) = K/Rt$; where $Rt$ is the parallel equivalent resistance of all the resistances which may exist between the D.C. network and ground.

Figure 1:
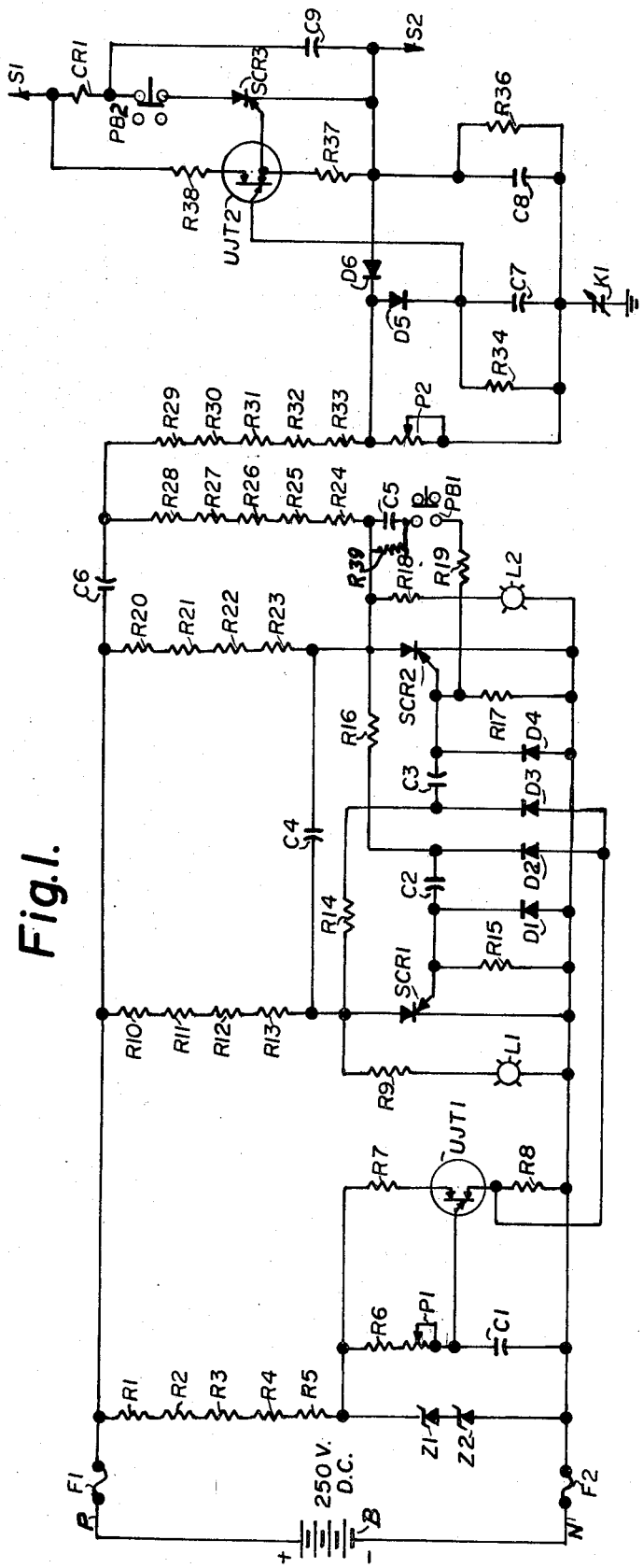
FIG. 1 is a schematic circuit diagram showing a solid state ground detection circuit for a D.C. distribution network and embodying the principles of the present invention.

Referring more particularly to FIG. 1 of the drawing, the ground detector is connected to busses P and N of a center tapped battery B. Overload protection is insured by fuses F1 and F2. Resistors R1, R2, R3, R4 and R5 combined with Zener diodes Z1 and Z2 provide a stabilized power supply to a time base made by resistors R6, R7, R8, P1, capacitor C1 and unijunction transistor UJT1. The pulses obtained from the time base are used to trigger a flip-flop type circuit consisting of resistors R10, R11, R12, R13, R14, R15, R16, R17, R20, R21, R22, R233, capacitors C2, C3, C4, diodes D1, D2, D3, D4 and silicon controlled rectifiers SCR1 and SCR2.

The flip-flop circuit is initially set by a pulse made by the circuit comprising capacitor C5, pushbutton switch PB1, and resistors R19 and R39 and the operation of the flip-flop is monitored by the lights L1 and L2 which are equipped with dropping resistors R9 and R18.

The measuring resistor is made by the series connection of the resistors R24 through R33 and variable resistor P2. As silicon controlled rectifier SCR2 is turned on and off, resistor R24 is sequentially connected to bus P or N (Resistors 20 through R23<<Resistors 24 through 33) resistor P2 being connected to ground through the contact K1.

Capacitor C6 is used to attenuate the effect of the charging and discharging current of the stray capacitance of the D.C. distribution network. When silicon controlled rectifier SCR2 is in its "OFF" state, resistor R24 is connected to bus P and if resistances to ground are present, a current will flow through resistor P2; the diode D5 is conducting and the capacitor C7 will charge to a voltage proportional to the current flowing through resistor P2 (neglecting the voltage drop across the diode).

When silicon controlled relay SCR2 is in its "ON" state, resistor R24 is connected to bus N and if resistances to ground are present a current flows through resistor P2; the diode D6 is conducting with subsequent charge of capacitor C8.

As the time constants resistor R34, capacitor C7, resistor R36 and capacitor C8 are very long, the circuit made by diodes D5, D6, capacitors C7, C8 and resistors R34 and R36, provides a voltage which, through the series connection of capacitor C7 and C8, is proportional the sum of two currents flowing through the same resistor, at different time and with reverse polarity.

When this voltage reaches a preset value, as determined by unijunction transistor UJT2, a pulse is obtained which triggers silicon controlled rectifier SCR3 which, in turn, energizes the alarm relay CR1 ( through the reset pushbutton PB2).

Figure 2:
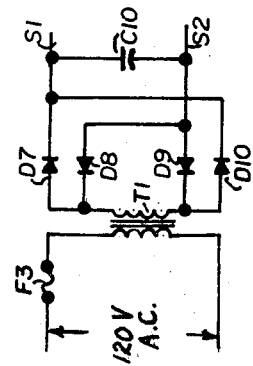
FIG. 2 is a circuit diagram of the power supply applied between terminals S1–S2 of FIG. 1.

The power supply applied across terminals S1 and S2 for the circuit made by unijunction transistor UJT2, resistors R37, R38, silicon controlled rectifier SCR3, control relay CR1, capacitor C9 and switch PB2 is obtained from a separate isolated circuit illustrated in FIG. 2 and made by transformer winding T1, diodes D7, D8, D9, D10 and capacitor C10, which is connected to 120 v. A.C. and protected by fuse F3.

Figure 3:
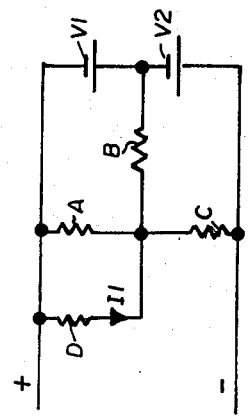
FIG. 3 is an equivalent circuit for that shown in FIG. 1 illustrating resistance D connected to the positive bus; and, FIG. 4 is an equivalent circuit showing the resistance D connected to the negative bus.

Referring to FIG. 3 and assuming that:

$A = Rgp$ ( Resistance to ground from bus "P")
$B = Rgpn$ ( Resistance to ground from bus "PN")
$C = Rgn$ ( Resistance to ground from bus "N")
$D = RP2 + ($ R24 through R33$)$
$V1 = 125$ v. battery B1
$V2 = 125$ v. battery B2

Battery B may have a value of 250 volts and the circuit may detect a resistance to ground value which is manually adjustable between 0 and 50,000 ohms. The digital output (contact closure) is provided for remote indication or alarm when a ground is detected.

I1 is equal to the current flowing through RP2 when resistor R24 is connected to bus "P."

I2 is equal to the current flowing through RP2 when resistor R24 is connected to bus "N."

For the purpose of this demonstration, the circuit of FIG. 1 is simplified in the equivalent circuit of FIG. 3 when resistor R24 is connected to bus "P."

Using the superposition theorem:

$$I1[F(v2)] = \frac{V2}{C + \dfrac{1}{\dfrac{1}{D}+\dfrac{1}{A}+\dfrac{1}{B}}} \cdot \frac{\dfrac{AB}{A+B}}{D + \dfrac{AB}{A+B}}$$

$$= \frac{V2AB}{ABC + ACD + BCD + ABD}$$

$$I1[F(v1)] = \frac{V1}{\dfrac{BC}{B+C} + \dfrac{AD}{A+D}} \cdot \frac{A}{A+D}$$

$$= \frac{V1A(B+C)}{ABC + ACD + BCD + ABD}$$

Figure 4:
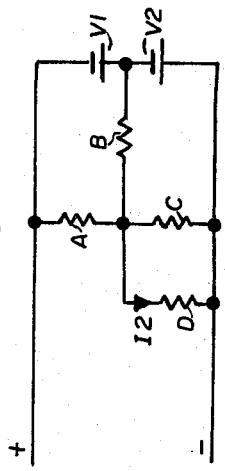

Referring to FIG. 4, when resistor R24 is connected to bus "N," the simplified diagram is illustrated, wherein it is assumed that:

$A = Rg P$
$B = Rg PN$
$C = Rg N$
$D = Rp2 - ($ R24 through R33$)$ (R24 through R33, R20 through R23)
$V1 = 125$ v. battery B1
$V2 = 125$ v. battery B2

$$I2[F(v2)] = \frac{V2}{\frac{AB}{A+B} + \frac{DC}{D+C}} \cdot \frac{C}{D+C}$$

$$= \frac{V2(A+B)C}{ABC + ACD + BCD + ABD}$$

$$I2[F(v1)] = \frac{V1}{A + \frac{1}{\frac{1}{B} + \frac{1}{C} + \frac{1}{D}}} \cdot \frac{\frac{BC}{B+C}}{D + \frac{BC}{B+C}}$$

$$= \frac{V1BC}{ABC + ACD + BCD + ABD}$$

$$(I1 + I2) = I1[F(v2)] + I1[F(v2)] + I2[F(v2)] + I2[F(v1)]$$

$$(I1 + I2) = \frac{V2AB + V1A(B+C) + V2(A+B)C + V1BC}{ABC + BCD + ABD + ACD}$$

$$(I1 + I2) = \frac{(V1+V2) \cdot (AC + BC + AB)}{ABC + BCD + ABD + ACD} = \frac{V1+V2}{\frac{ABC}{AC+BC+AB} + D}$$

$$(I1 + I2) = \frac{V1+V2}{(Rp2 + R24 \text{ thru } R33) \frac{1}{\frac{1}{R_gP} + \frac{1}{R_gPN} + \frac{1}{R_gN}}}$$

$$= \frac{K}{\frac{1}{\frac{1}{R2P} + \frac{1}{RGPN} + \frac{1}{R2N}}}$$

The above denominator is the parallel equivalent resistance RT.

The principle of detection of the measurement in the circuit shown in FIG. 1 is unique in that its sensitivity is independent of the polarity (plus, plus/minus or minus) of the D.C. bus on which the ground occurs. It is further unique because the occurrence of multiple grounds, irrespective of the bus on which they occur, will cause the ground detection circuit to operate as if all such ground resistances were in parallel with each other.

In addition, the circuit can accommodate high values of distributed capacitance to ground and is protected against misoperation due to voltage transients by the use of integrating circuitry.

Thus it will be seen that we have provided an efficient and reliable ground detecting system for a D.C. distribution network wherein the detection system is based on the principle that the algebraic sum of the current flowing through a resistance having one end connected to ground and the other end being alternately connected to the plus bus, then to the minus bus of a multiple tapped battery, is inversely proportional to the "total resistance" to ground of the network; also wherein the ground detector is independent of the polarity of the D.C. bus on which the ground occurs.

Thus it will be seen that we have illustrated and described a single specific embodiment of our invention, but it will be understood that this is by way of illustration only and that various changes and modifications may be contemplated within the scope of the following claims.

We claim:

1. An unground D.C. distribution network including a positive bus, a negative bus and a source of direct current connected across said busses, tap means for said source, a resistance network connected between said busses and ground including a resistor, and switching means for connecting one end of said resistor alternately to said positive and negative busses, and ground detector means responsive to the sum of the currents flowing through said resistor during said alternate connections.

2. A network as recited in claim 1 wherein said resistance network includes a time base and wherein said switching means includes a flip-flop circuit triggered by said time base.

3. A network as recited in claim 2 wherein said flip-flop circuit includes silicon controlled rectifier means for operating said switching means.

4. A network as recited in claim 1 wherein said ground detector includes a diode and a capacitor which is charged to a voltage proportional to the current flowing away from ground through said resistor, said diode preventing the capacitor from discharging its accumulated charge when switching to the opposite polarity bus.

5. A network as recited in claim 4 but with an opposite polarity diode, its capacitor being charged to a voltage proportional to the current flowing towards ground through said resistor.

6. A network as recited in claim 4 wherein said ground detector means also includes a unijunction transistor which controls a thyristor.

7. A network as recited in claim 6 together with a control relay so that upon attainment of a predetermined total charge across said capacitors, representative of a predetermined value of ground resistance, said control relay will be operated by the turning on of the thyristor by discharge of said capacitors through said unijunction transistor.

8. The method of detecting a ground in an underground D.C. distribution network including a positive bus, a negative bus, a source of direct current connected across said busses having tap means and a resistance network connected between said busses and said ground, including a resistor; which method comprises connecting one end of said resistor alternately to said positive and negative busses and detecting the algebraic sum of currents flowing through said resistor during said alternate connections.

* * * * *